United States Patent
Guerard et al.

(10) Patent No.: US 6,728,549 B1
(45) Date of Patent: Apr. 27, 2004

(54) SWITCHING TO AN IMPROVED BEARER DURING A CALL CONNECTION

(76) Inventors: Chrisophe Guerard, 19 Impasse de la Montee, 76960 Notre Dame de Bondeville (FR); Simon Baillarin, 4 Rue Dalayrac, 31000 Toulouse (FR)

( * ) Notice: Subject to any disclaimer, the term of this patent is extended or adjusted under 35 U.S.C. 154(b) by 215 days.

(21) Appl. No.: 09/667,348

(22) Filed: Sep. 22, 2000

(30) Foreign Application Priority Data

Sep. 27, 1999 (EP) .............................................. 99460059

(51) Int. Cl.⁷ .................................................. H04Q 7/20

(52) U.S. Cl. ................. 455/514; 455/422.1; 455/452.2; 455/450; 455/509; 370/330; 370/332

(58) Field of Search ................................ 455/422, 426, 455/436, 450, 452, 462, 465, 509, 513, 514; 370/313, 314, 330, 331, 332, 337, 347

(56) References Cited

U.S. PATENT DOCUMENTS

| 5,416,778 A | * | 5/1995 | Chan et al. ................. 370/330 |
| 5,825,757 A | * | 10/1998 | Tat et al. ..................... 370/330 |
| 5,940,380 A | * | 8/1999 | Poon et al. ................. 370/330 |
| 6,381,462 B1 | * | 4/2002 | Charas ........................ 455/452 |

FOREIGN PATENT DOCUMENTS

| EP | 0 722 259 A2 | 7/1996 | ............ H04Q/7/38 |
| WO | WO 98/15148 | 4/1998 | ............ H04Q/7/38 |
| WO | wo 99/49685 | 9/1999 | ............ H04Q/7/38 |

* cited by examiner

*Primary Examiner*—William Trost
*Assistant Examiner*—James S Ewart

(57) ABSTRACT

A method for managing information transmission between a telecommunications terminal comprising a so-called "blind" radio and a base station of a telecommunications network. The method is used for switching bearers during this transmission. To switch from a first bearer to a second bearer, it is envisaged to cut the programming of the "blind" radio on the first bearer while searching for the second bearer. This thereby allows to considerably increase the number of new potential bearers.

3 Claims, 3 Drawing Sheets

SWITCHING TO AN IMPROVED BEARER DURING A CALL CONNECTION

CROSS-REFERENCE TO RELATED APPLICATION

This application claims priority of Europaen Patent Application No. 994600591, which was filed on Sep. 27, 1999.

1. Field of the Invention

This invention relates to a method for managing information transmission between a telecommunications terminal comprising a so-called "blind" radio and a base station of a telecommunications network, said method being used for switching bearers during this transmission. It is implemented in the field of wireless telecommunications network using a so-called "blind" radio.

2. Background of the Related Art

The invention will be described with reference to a DECT telecommunications network without this having to be considered as limiting the scope of the invention to this standard. In DECT systems, communications are transported over carrier frequencies, each having a frame structure. Three frequency bands are allocated to the DECT system. Each of these frequency bands is split into ten carrier frequencies. Each carrier is divided into 24 time intervals, twelve of which are used for transmission in the uplink direction (from terminal to base station) and the other twelve for transmission in the downlink direction (from base station to terminal). Conventionally, the link between a terminal and its base station is performed, in the downlink direction, on a first bearer—time interval n and carrier frequency c—and, in the uplink direction, on another bearer depending on the first one—time interval n+12 and carrier frequency c—.

Throughout the description, the pair composed of at least one time interval within the radio frame and a carrier frequency, whereon a radio link is established, will be called bearer. In the case of a telephone call (voice), bearers each comprise a single time interval. For data transportation, bearers can comprise several consecutive time intervals. Throughout the description, the bearer composed of time interval n and carrier frequency c is marked as [n;c] and the bearer composed of time intervals n and n+1 and carrier frequency c is marked as [(n,n+1);c].

When interference comes up disrupting the radio link between the terminal and the base station, it is sometimes required to switch bearers. The terminal then starts to search for a new bearer whereon the radio link will not be disrupted. When a new bearer has been found, the communication between the terminal and the base station is transferred onto this new bearer by reprogramming the radio of the terminal and the base station on this new bearer.

During the search for a new bearer, the terminal radio must process simultaneously the bearer signals of the disrupted link and those of the new potential bearer. Due to this dual processing, it appears that using a so-called "blind" radio in the terminals significantly limits the number of new potential bearers. Indeed, so-called "blind" radios specify the radios that cannot process the signals contained in two consecutive time intervals. As a result, such a radio, also called blind radio, cannot search for a new bearer comprising a time interval adjacent to that of the bearer already used. This impossibility is illustrated on a DECT frame represented in FIG. 1. In this carrier frequency c DECT frame, the bearers [6;c] and [18;c] are allocated to transmitting information between the terminal and the base station, respectively in the downlink and uplink directions. If, for any reason, bearer [6;c] (or bearer [18;c]) must be switched, the terminal's "blind" radio is not capable of processing simultaneously bearer [6;c] and bearer [5;c] or [7;c] (respectively [17;c] or [19;c]). Neither will it be able to process bearer [5;c'], [6;c'] or [7;c'] (respectively [ 17;c'], [ 18;c'] or [ 19;c']) with c' designating a carrier frequency different from c. Therefore, the terminal must search for a new bearer among the other bearers available. The new bearers [5;c] and [7;c] (respectively [17;c] and [19;c]) prohibited by the "blind" radio are rasterized in the DECT frame of FIG. 1.

Consequently, a "blind" radio significantly limits the bearer switching capacities. This may result in blocking situations when the remaining bearers are already being used for other calls.

It should be noted, in FIG. 1, that exchanges between the terminal and the base station are performed in each direction for a single time interval. This data exchange protocol is commonly called LU1. In particular, it is used for transporting voice (telephone call). FIG. 2 illustrates a second data exchange protocol commonly called LU7, wherein exchanges are performed in each direction for two consecutive time intervals. This bearer then comprises two adjacent time intervals and a carrier frequency. For clarity's sake, this is then called a dual bearer to distinguish them from single bearers comprising a single time interval. FIG. 2 represents a DECT frame of carrier frequency c. A terminal and a base station communicate over the dual bearer [(6,7);c] in the downlink direction and the dual bearer [(18,19);c] in the uplink direction. According to this protocol, the number of the first of two consecutive time intervals must be even. In this example, if the terminal is supposed to be fitted with a "blind" radio, the new dual bearers comprising the single bearers [5;c or c'] and [8;c or c'] are prohibited. In addition, as the number of the first time interval of the new dual bearer must be even, the choice of new dual bearers is even more restricted.

If it is presumed that no other terminal is communicating, there are 3×10 new potential dual bearers left:

[(0,1);c],

[(2,3);c] where c is any carrier frequency

[(10,11);c]

Blocking situations can occur when other terminals are communicating. A blocking example on a carrier frequency c is illustrated by FIG. 3. The dual bearer [(6,7);c] is used for transporting data and the single bearers [0;c], [3;c] and [11;c] (hatched in the frame of FIG. 3) are used for transporting telephone calls. If for any reason, it is required to switch dual bearers, there is no other possibility on this carrier because of the constraints imposed by the blind radio and the LU7 protocol.

SUMMARY OF THE INVENTION

It is the object of the invention to provide a transmission management method allowing to reduce the number of blocking situations during bearer switching.

It is another object to provide a method allowing to increase traffic in the telecommunications network comprising terminals fitted with "blind" radios.

Moreover, according to the invention, it is proposed to disconnect the "blind" radio of the terminal when searching for a new bearer so as to avoid the possibility of establishing a link on a new bearer with a time interval adjacent to that of the bearer already being used.

For this purpose, the object of the invention is a method for managing information transmission via successive radio frames between a telecommunications terminal comprising a so-called "blind" radio and a base station of a telecommunications network, each radio frame comprising a plurality of bearers, each defined by at least one time interval within the radio frame and a carrier frequency, said information transmission being performed on the first bearer, said method being used for bearer switching during said transmission and comprising a step of searching for a new bearer available and a step of programming the so-called "blind" radio on said new bearer, characterized in that said search step is taking place on a limited number of radio frames, and in that, during this step, the programming of the so-called "blind" radio on said first bearer is interrupted.

In this way, the new bearers can be defined for time intervals adjacent to that (or those, in case of a first dual bearer) of the first bearer.

According to a preferred embodiment, the information contained in the radio frames not received by the terminal during the search step are saved in a buffer memory of the base station during this step, then retransmitted to the terminal after the link has been established on the new bearer.

BRIEF DESCRIPTION OF THE DRAWINGS

Other features and advantages of the invention will appear when reading the following detailed description wherein reference is made to the accompanying drawings, where.

DETAILED DESCRIPTION

In order to clarify the description, the bearer whereon the link is established before bearer switching is called the first bearer.

Figure 3:
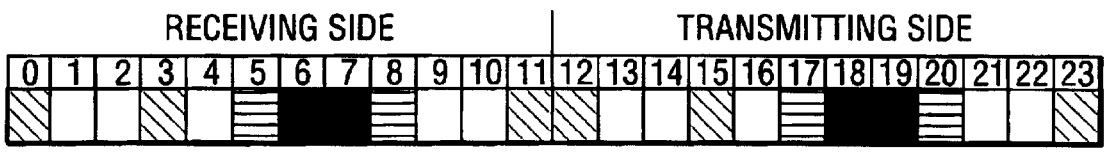
Figure 5:
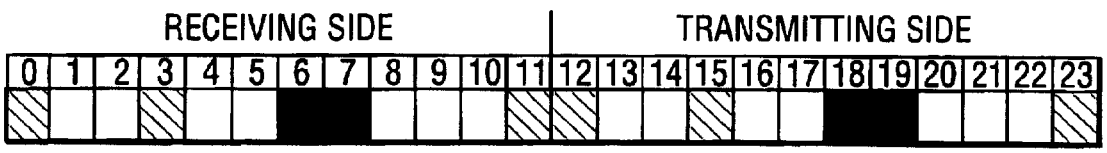
FIG. 5 shows the new potential bearers of a terminal fitted with a "blind" radio when the inventive transmission management method is applied.

According to the invention, programming the "blind" radio of the terminal on the first bearer is interrupted during the search for a new bearer. Thus, the constraints imposed by the "blind" radio of the terminal no longer apply to bearer switching. Thus, in the example of FIG. 3, the new bearers [5;c] and [8;c] are no longer prohibited. This new situation is illustrated by FIG. 5.

Figure 6:
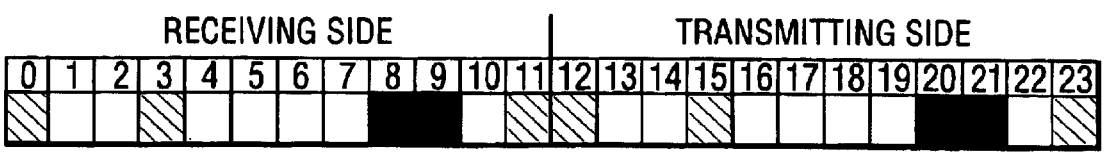
FIG. 6 shows bearer switching according to the invention for a dual bearer of FIG. 4.
Figure 4:
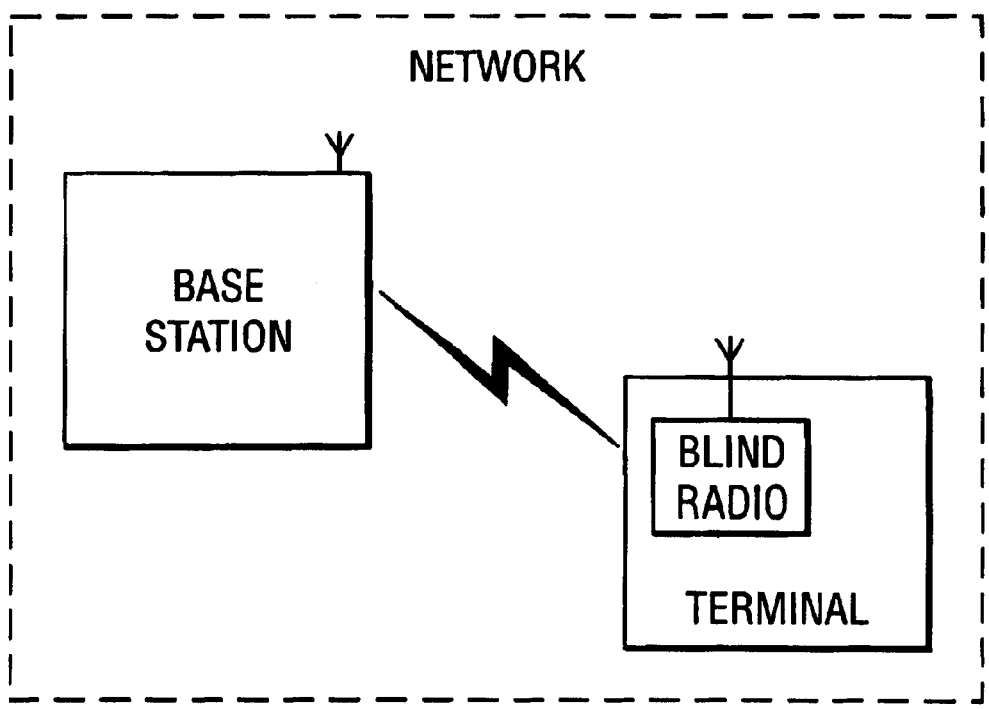
FIG. 4 shows a telecommunications network including a base station and a telecommunications terminal, the terminal including a "blind" radio.

It can then be envisaged to transfer the call to the new dual bearers [(4,5);c] or [(8,9);c], which was impossible in prior art. In FIG. 6, the call has been transferred onto the new bearer [(8,9);c].

Figure 2:
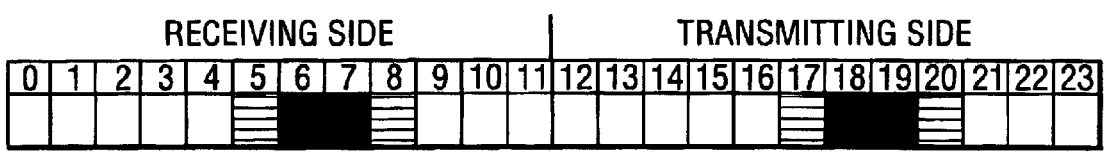

Referring again to FIG. 2, interrupting programming of the "blind" radio on the first bearer during the search makes it possible to raise the numbers of new potential bearers from 3×10 to 5×10, corresponding to an increase of 67%.

Figure 1:
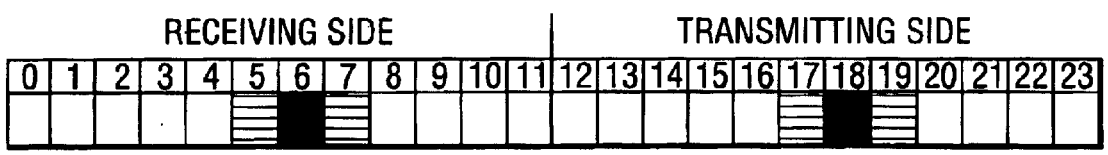
FIGS. 1, 2 and 3, already described, show the new potential bearers of a terminal fitted with a prior art "blind" radio.

Interrupting programming of the "blind" radio on the first bearer is done only for a limited number of radio frames. When transporting telephone calls according to the LU1 protocol (FIG. 1), the absence of certain frames cannot be perceived by the human ear. Therefore, it is not necessary to save them.

On the contrary, when transporting data according to the LU7 protocol (FIG. 5), this absence of radio frames is not acceptable. Consequently, the data not received by the terminal when interrupting programming of its radio on the first bearer must be saved in a buffer memory of the base station. The data saved during the step of searching for the new bearer will later be retransmitted piece-wise on the new bearer together with the data of the following frames.

Figure 7:
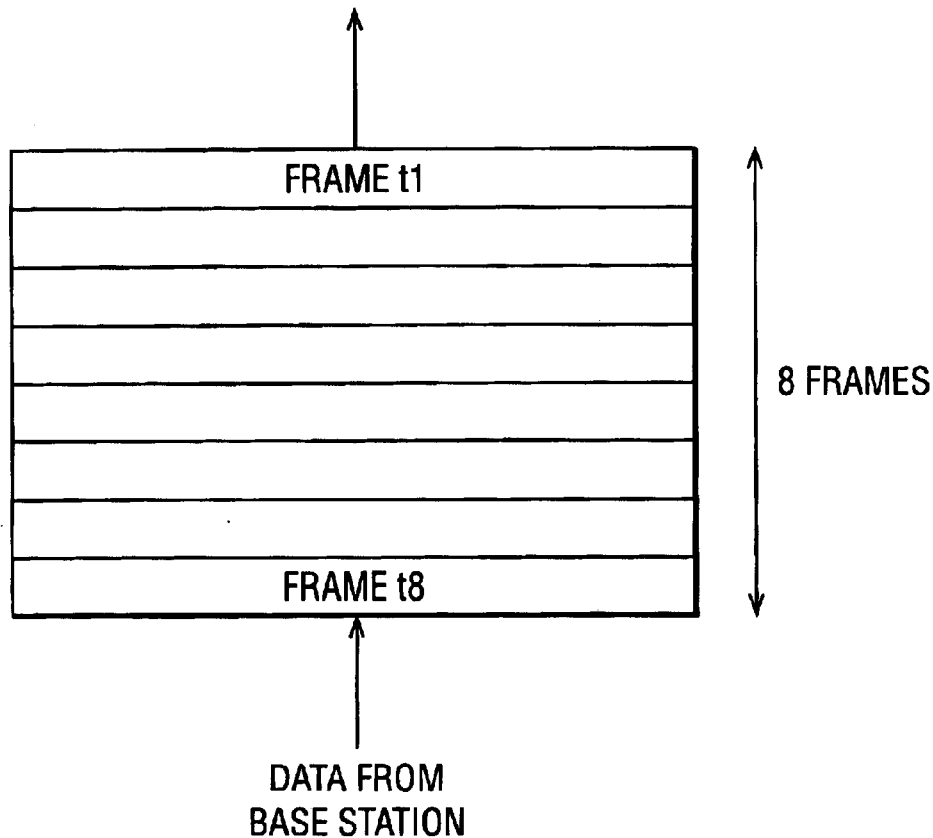
FIG. 7 shows a buffer memory of a base station capable of saving the contents of eight DECT frames.

The buffer memory used for saving the data not received generally already exists in the base stations. It is usually used for saving the data when requesting repetition (ARQ) for error correction. A sample buffer memory is shown in FIG. 7. It comprises eight registers each capable of storing the data contained in time interval of a DECT frame. With this buffer memory, programming the "blind" radio can be interrupted during a maximum of eight radio frames without information loss.

Thus, the data not transmitted is saved in this buffer memory. The link being transferred to the new bearer, the data is then retransmitted little by little to the terminal together with the current data.

Figure 8:
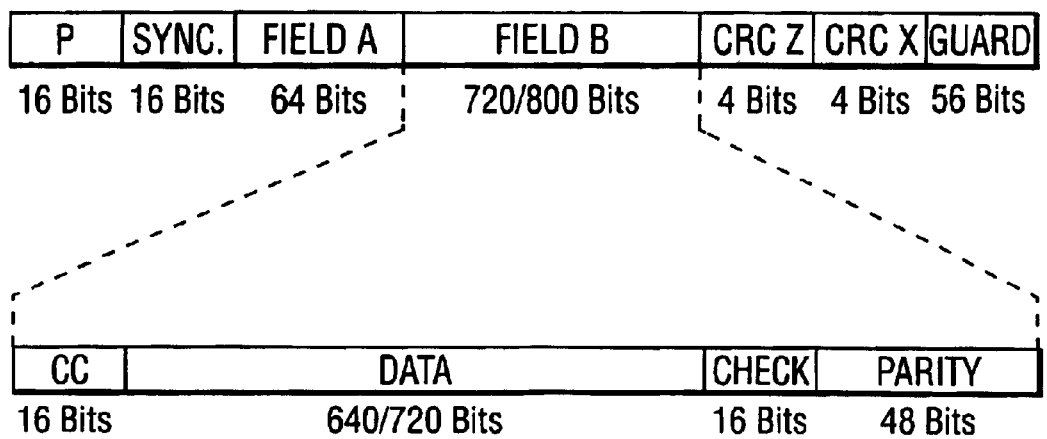
FIG. 8 shows the information contained in a time interval of a DECT frame.

The information contained in a time interval of a DECT frame is shown in FIG. 8. A time interval comprises:
- a 16-bit preamble P;
- a 16-bit synchronization word;
- a 64-bit field A;
- a 720 or 800-bit field B;
- a 4-bit CRC control word X;
- a 4-bit CRC control word Z
- a 56-bit guard space.

The data is contained in field B. This field is composed of:
- a 16-bit CC control field
- a 640 or 720-bit data field;
- a 16-bit check word;
- a 48-bit parity code.

Thus, field B can contain 720 or 800 data bits. Also, for retransmitting the data saved in the buffer memory, current field B is raised from 720 to 800 bits for evacuating one eighth (⅛) of the data of a saved frame (i.e. 80 bits) to each current frame.

Of course, it should be noted that if there is no new bearer available because the network being saturated, the "blind" radio is reprogrammed on the first bearer after the search step and the data not received by the terminal during the search step is then retransmitted together with the current frames as done previously.

We claim:

1. A method for managing information transmission via successive radio frames between a telecommunications terminal and a base station of a telecommunications network, each radio frame comprising a plurality of bearers each defined by at least one time interval within the radio frame and a carrier frequency, said information transmission being performed over a first bearer, the terminal comprising a radio, the radio being unable to process the signals contained in two consecutive time intervals so that a bearer defined by a time interval in use by the first bearer cannot be a new bearer candidate, said method being used for switching bearers during said transmission and comprising the steps of:

searching for a new bearer available; and programming the radio on said new bearer, wherein said search step takes place for a limited number of radio frames, and in that, during this step, programming of the radio on the first bearer is interrupted so that a bearer defined by a time interval adjacent a time interval defining the first bearer can be a new bearer candidate.

2. The method according to claim 1, characterized in that, during said search step, the information not received by the terminal is saved in a buffer memory of the base station and is transmitted subsequently during information transmission on said new bearer.

3. The method according to claim 2, characterized in that, if said buffer memory comprises m buffer registers each capable of saving a radio frame, the search step takes place for a maximum of m radio frames without information loss.

* * * * *

UNITED STATES PATENT AND TRADEMARK OFFICE
CERTIFICATE OF CORRECTION

PATENT NO. : 6,728,549 B1
DATED : April 27, 2004
INVENTOR(S) : Christophe Guerard and Simon Baillarin It is certified that error appears in the above-identified patent and that said Letters Patent is hereby corrected as shown below:

Title page,
Item [73], Assignee, add -- [73] -- and insert -- Lucent Technologies Inc., Murray Hill, N.J. --

Signed and Sealed this

Thirty-first Day of August, 2004

JON W. DUDAS
*Director of the United States Patent and Trademark Office*